March 22, 1966     KAZUMI MASAKI     3,241,557

LOW FREQUENCY THERAPEUTIC EQUIPMENT

Filed Sept. 11, 1962     2 Sheets-Sheet 1

PRIOR ART WAVE SHAPE

INVENTOR
KAZUMI MASAKI

BY Everett J. Schroeder
Kenneth D. Siegfried
ATTORNEYS

# United States Patent Office 3,241,557
Patented Mar. 22, 1966

3,241,557
LOW FREQUENCY THERAPEUTIC EQUIPMENT
Kazumi Masaki, Toyonaka, Osaka Prefecture, Japan, assignor to Sutetaro Yamashiki, Kobe, Japan
Filed Sept. 11, 1962, Ser. No. 222,798
7 Claims. (Cl. 128—422)

This invention relates to the field of electrical therapeutic equipment and more particularly to low frequency therapeutic equipment.

One of the problems associated with any portable equipment in which batteries are used, is the conservation of the energy from the battery and this is also important in the use of therapeutic equipment which is portable or held in the hand when used as an applicator. The present invention is directed to a low frequency therapeutic device which is designed so that the power source is connected to the oscillator or amplifier only when the equipment engages the human body in the area to be treated. Certain pieces of equipment, such as the common radio, produce audible sounds and will continue to operate if the power is not shut off and the audible sounds indicate that the device is still in operation. However, in the use of therapeutic equipment, there is generally no sound or vibration produced which will alert the user that the power is still on, even though the device is not being used.

My invention is directed to low frequency therapeutic equipment in which the power source is connected to its oscillator or amplifier only when the therapeutic probes are in contact or engaging the human body and the circuit is broken when the probes are disengaged or detached from the human body. Therefore, there is a positive means provided for insuring that the battery life will be maintained to the highest degree when the therapeutic equipment is not in operation. In other words, the power source is applied to the circuit through the use of the human body without resort to any external switching and in fact, the human body forms a part of the circuit and the circuit is therefore automatically interrupted and current cut off when the human body or that portion thereof is removed from contact with the electrodes of the device. As mentioned previously, the importance of conserving the battery life is more important where a device is of such compact size as to be held in the hand where the patient might treat a particular body portion himself. Generally instruments of this type are not equipped with any indicating components and therefore, the user finds it difficult to determine whether the instrument has its power source connected to the circuit or not.

It is therefore a general object of the present invention to provide circuit means for automatically controlling the actuation of electrical therapeutic equipment when applied to the human body.

It is still another object of the present invention to provide circuit means which may be substituted for a battery in a multivibrator circuit when used in electrical therapeutic equipment.

It is still another object of the present invention to provide circuit means for conserving the battery life in a transistor equipped multivibrator circuit used in electrical therapeutic equipment.

These and other objects and advantages of my invention will more fully appear from the following description made in connection with the accompanying drawings, and in which.

Figure 1:
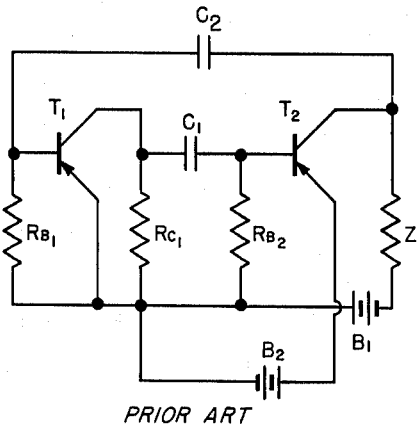
FIG. 1 is a schematic diagram of a common multivibrator.
Figure 4:
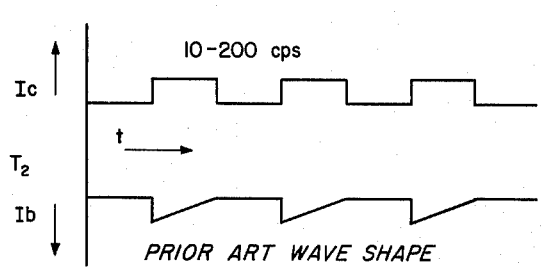
FIG. 4 is a diagram of the multivibrator wave shapes taken at the collector and base of transistor $T_2$.

FIG. 1 shows a common multivibrator, in which a pair of batteries $B_1$ and $B_2$ are shown. A resistor $R_{B_1}$ is connected between the positive terminal of battery $B_1$ where the emitter element of a transistor $T_1$ is also connected. The other end of resistor $R_{B_1}$ is connected to the base element of transistor $T_1$. A capacitor $C_1$ is connected between the collector of transistor $T_1$ and the base element of a transistor $T_2$. A resistor $R_{B_2}$ is connected between the positive terminal of battery $B_1$ and the base element of transistor $T_2$. A resistor $R_{C_1}$ is connected to the collector of transistor $T_1$ and to a negative terminal of a battery $B_2$ which has its positive terminal connected to the emitter elements of transistor $T_2$. A capacitor $C_2$ is connected between a collector of transistor $T_2$ and the base of transistor $T_1$. To complete the circuit, and impedance Z is connected between the collector of transistor $T_2$ and the negative terminal of battery $B_1$. The multivibrator shown in FIG. 1 produces wave shapes such as found in FIG. 4 with a frequency of operation of approximately 10 to 200 cycles per second. The curvel labeled $I_c$ is taken from the collector element of transistor $T_2$ and the curve labeled $I_b$ is taken from the base element of transistor $T_2$. Thus a low frequency wave shape is produced from the multivibrator.

Figure 2:
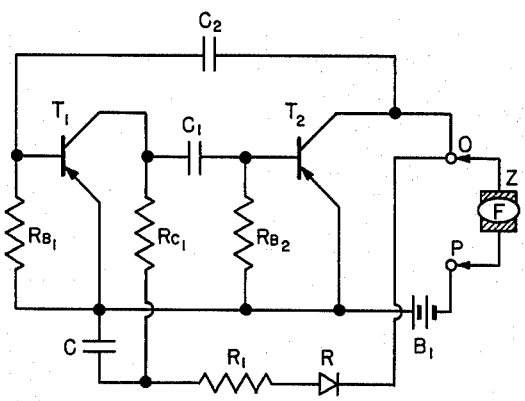
FIG. 2 is a schematic diagram of a multivibrator in which circuit means have been substituted for a power source.

In FIG. 2, the transistors $T_1$ and $T_2$ are arranged in a multivibrator circuit similar to that shown in FIG. 1 with the exception that the impedance Z has been replaced by a portion of the human body F at terminals O and P. It will also be noted that a capacitor C has been added to the circuit between the emitter of transistor $T_1$ and resistor $R_{C_1}$, where both terminals are no longer connected to the positive terminal of battery $B_1$. A resistor $R_1$ is connected at the junction of capacitor C and resistor $R_{C_1}$ and has its other end connected to a diode or a rectifier R which is in turn connected to terminal O. In this type of arrangement, when the human body F is removed from terminals or electrodes O and P in the collector circuit of transistor $T_2$, the circuit of battery $B_1$ is opened which prevents current from flowing in the circuit. When the body portion F is connected between terminals O and P, a current is supplied from the battery $B_1$ though the human body portion F to complete the circuit. In this manner, current flows from the terminal O through the diode or rectifier and is dropped across resistance $R_1$ where the voltage is applied to the collector of transistor $T_1$ so that voltage is actually applied to the collectors of both transistors $T_1$ and $T_2$ to produce oscillation. The capacitor C is used to provide a smoothing element to filter the rectangular wave shape of the current which is developed from terminal O. Thus, the diode or rectifier R and the capacitor C when used in this manner, actually replace battery $B_2$ as found in FIG. 1. It will become apparent that capacitor C will have a rather large capacitance. In this particular circuit, when the capactive reactance or impedance of the human body F is connected between the electrodes or terminals O and P, the transistors $T_1$ and $T_2$ are supplied with power and produce oscillations and when the body F is removed from the electrodes, the oscillation stops. Thus no switch is required to turn the device on or off and as long as the body portion does not remain connected to the electrodes, there is no current flow in the circuit.

Figure 5:
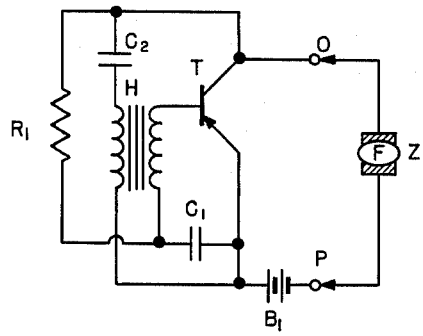
FIG. 5 is a schematic diagram of a transformer coupled oscillator circuit with direct coupling to the base.

FIG. 5 is directed to a transformer coupled oscillator in which the primary side of a transformer H is connected to the collector element of the transistor T through a capacitor $C_2$. The other end of the primary winding is connected to the positive terminal of battery $B_1$ and one end of the secondary winding of the transformer H is connected to the base of the transistor and the other end is connected to the emitter of the transistor through a capacitor $C_1$. At the junction of the capacitor $C_1$ and the secondary winding, a resistor $R_1$ is connected and is also connected to the collector terminal of transistor T. The negative terminal of battery $B_1$ is connected to electrode D and the other electrode O, is connected to the collector element of transistor T. Again, when the human body F engages the electrode O and P, a current flows from battery $B_1$ to the collector of the transistor T and as a result, a voltage change is transmitted through the capacitor $C_2$ to the primary side P of transformer H, thereby inducing a voltage into the secondary winding S of the transformer H. The induced voltage is then impressed on the base of the base of the transistor T. The resistor $R_1$ and the capacitor $C_1$ are used to regulate the base bias voltage of the transistor T. Of course, when the body element F is removed from electrodes O and P, again the circuit is broken and no current flows from the battery.

Figure 6:
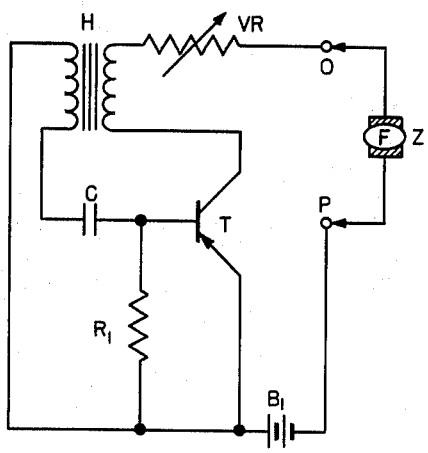
FIG. 6 is a schematic diagram of an oscillator circuit with a condenser coupled transistor base.
Figure 7:
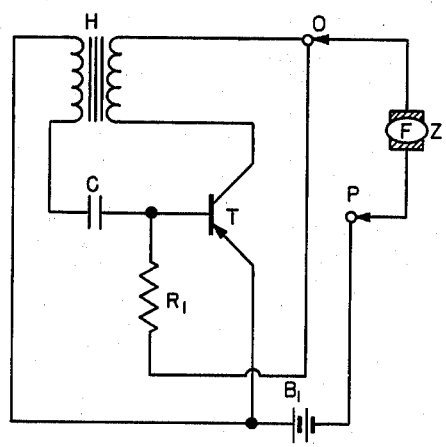
FIG. 7 is a schematic diagram of an oscillator circuit with the bias resistance of the transistor base coupled with a negative side of the voltage source through a portion of the human body.

FIG. 6 shows a slightly different variation in the oscillator to be used in a human body to complete the circuit in which a transistor T has its emitter connected to a positive terminal of a battery $B_1$ and has its base element connected to the positive terminal battery $B_1$ through a resistor $R_1$. A capacitor C is connected to the base of transistor T and is also connected to one end of a secondary winding of a transformer H. The other end of the secondary winding is connected to the positive side of battery $B_1$. The collector of transistor T is connected to one end of a primary winding of transformer H and the other end of the winding is connected to a variable resistance. The other end of the variable resistance is connected to electrode or terminal O and the negative terminal battery $B_1$ is connected to electrode or terminal P. The human body element F is then connected between terminals O and P to complete the circuit and the primary side T of the transformer has current flow therethrough to the collector of transistor T and this current change induces a voltage on the secondary side of the transformer H. The induced voltage is then impressed through the capacitor C on the base of the transistor T thereby causing the circuit to oscillate. In order to pass more current through the human body F a slight variation in the circuit which is shown in FIG. 7. In that circuit, instead of connecting resistor $R_1$ between the base of transistor T and the positive terminal of the battery, it is connected to terminal O at the output. Thus using this arrangement, a more negative voltage is applied to the base and this will allow the circuit to pass more current through the body portion than that shown in FIGS. 5 and 6.

Figure 3:
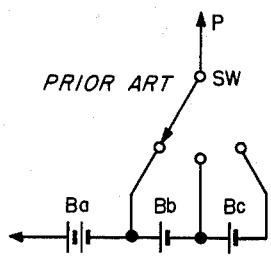
FIG. 3 shows a simple circuit diagram of a switching arrangement to provide various amounts of power in the multivibrator circuits.

If it is desirable to produce more power in the circuit, a combination of batteries may be used as shown in FIG. 3. There, batteries $B_a$, $B_b$, and $B_c$ are all connected in series with taps between the batteries so that a switch SW may tap off the appropriate voltage and apply the voltage to the terminal P and the connections ordinarily connected to the positive terminal of battery $B_1$ in the other circuits.

Figure 8:
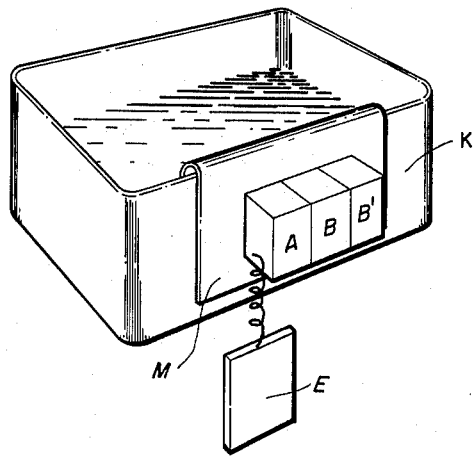
FIG. 8 shows a container with a solution for a foot treatment using the invention connected therewith.

FIG. 8 shows a container K in which a solution has been placed for the treatment of the hand or foot of an individual. The container is filled with water or a medical solution and an electrode plate M is put in the solution and the therapeutic oscillator designated generally as A is connected thereto with the other terminal connected generally to a plate E. A pair of batteries B and B' are shown generally which can be connected to the circuit and the circuit is completed by having the person put his foot or hand to be treated in the solution and the circuit is closed by placing another body portion upon plate E. Thus, it will be seen that when the portion of the body to be treated is removed from the solution, the circuit is broken and current is no longer drawn from the battery.

Figure 9:
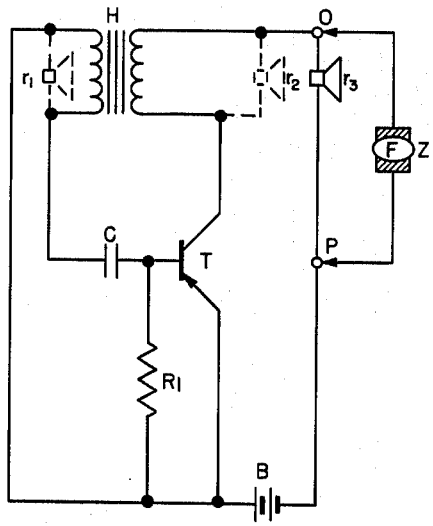
FIG. 9 is a schematic diagram of an oscillator circuit used with a crystal receiver for producing audible sounds.

FIG. 9 uses a transistor in which the emitter element is connected to the positive terminal of a battery B and the base element of the transistor T is connected to the positive terminal of battery B through a resistor $R_1$. A secondary winding of a transformer H has one terminal connected to the positive terminal of battery B and the other end of the winding is connected to the base of transistor T through a capacitor C. The primary side of transformer H, is connected to the collector element of transistor T and to terminal O. The negative terminal of battery B is connected to terminal T. Between terminals or electrodes O and P, the body portion F is connected in the manner described previously. A crystal receiver $r_3$ is connected between terminals O and P and since the oscillations are in the audible range, that is between approximately 10 and 200 cycles per second, the sound may be heard when current is passing through the circuit. There are alternate portions in which receiver $r_3$ may be connected and they are designated as $r_1$ across the secondary of transformer H and $r_2$ across the primary of transformer H. The receiver will work in any of these positions since the crystal receiver has a capacitive characteristic. Inasmuch as it does possess a characteristic of a capacitor, there is no current flow when the body element is removed from the circuit and the additional capacitive reactance offered by the crystal receiver is negligible in comparison with the body impedance. Obviously, any form of transducer can be used to convert the electrical signals to an audible sound and may be placed in different positions or locations within the circuit.

Typical values of the components as used in the different figures are set forth below in a table:

| Figure | Ref. No. | Value |
| --- | --- | --- |
| Fig. 1 | $C_{1,2}$ | 0.1–10 µf. |
|  | $R_{B1,2}$ | 10–50K |
|  | $R_{C1}$ | 10K |
|  | C | 10–20 µf. |
| Fig. 2 | $C_{1,2}$ | 0.1–10 µf. |
|  | $R_{B1,2}$ | 10–50K |
|  | R |  |
|  | $R_{C1}$ | 10K |
|  | $R_1$ | 10K |
| Fig. 5 | $C_1$ | 1–10 µf. |
|  | $C_2$ | 10 µf. |
|  | $R_1$ | 20–100K |
| Fig. 6 | $R_1$ | 100–500K |
|  | C | 0.1–2 µf. |
| Fig. 7 | $R_1$ | 100–500K |
|  | C | 0.1–2 µf. |
| Fig. 9 | $R_1$ | 100–500K |
|  | C | 0.1–2 µf. |

From the foregoing description of my invention it will be seen that I have provided means for producing a low frequency wave form to be used for therapeutic equipment in which the battery life is increased. In fact, the power is not applied to the circuit unless a portion of the body forms part of the circuit to have current flow therethrough. There is also provided means for determining when the low frequency therapeutic equipment is operating and it has been shown that for certain portions of the body such as the hands and feet, that a bath may be used with the equipment to produce a more satisfying effect.

It will, of course, be understood that various changes may be made in the form, details, arrangement and proportions of the parts without departing from the scope of my invention which consists of the matter shown and described herein and set forth in the appended claims.

1. Low frequency electrical therapeutic apparatus for use on a human body comprising:
    (a) a low frequency oscillator having at least one transistor element generating square wave voltages at a frequency between approximately 10 to 200 cycles per second;
    (b) a direct current power source having a pair of terminals, one of which is operatively connected to said oscillator to supply power thereto;
    (c) and a pair of electrodes for engaging a portion of the human body, such portion of the human body completing an electrical current path therethrough when said electrodes are so engaged, one of said electrodes being connected to the other of said power terminals and the other of said electrodes being operatively connected to said oscillator for conducting said square wave voltages through such body portion while simultaneously making and breaking the power connections to said oscillator when such human body portion is respectively engaged and disengaged with said electrodes.

2. Low frequency electrical therapeutic apparatus for use on a human body comprising:
    (a) a low frequency square wave oscillator having a first and second stage interconnected for operation and using a common conductor, and oscillator generating square wave voltages at a frequency between approximately 10 to 200 cycles per second;
    (b) a voltage supply circuit having connected in series, a capacitor, resistor, and diode with the capacitor having its other end connected to the common conductor of said oscillator;
    (c) a second resistor connected between the series connection of said capacitor and resistor and the output of the first stage of said oscillator to supply direct current thereto;
    (d) a direct current power source having a pair of terminals, one of which is operatively connected to the common conductor of said oscillator;
    (e) and a pair of electrodes for engaging a portion of the human body, such portion of the human body completing an electrical current path therethrough when said electrodes are so engaged, and one of said electrodes being connected to the other of said power terminals and the other of said electrodes being operatively connected to the output of the second stage of said oscillator and to the other end of said diode, said electrodes conducting said square wave voltages through such body portions while simultaneously making and breaking the power connections to the first and second stages of said oscillator when such human body portion is respectively engaged and disengaged with said electrodes.

3. The invention as set formth in claim 2 wherein: said low frequency square wave oscillator is a free running multivibrator having a pair of transistors, each of said transistors including emitter, base, and collector elements wherein the feedback circuits are connected in normal fashion, the emitter elements are connected to said common conductor, the outputs of said first and second stages are taken from the collector elements of said pair of transistors and such human body portion forms the resistive element between said direct current power source and the collector element of said second stage.

4. The invention as set forth in claim 1 including: a receptacle containing a medicated bath adapted for receiving such portion of the human body for treatment wherein one electrode of said pair is immersed in said bath and the other electrode of said pair is adapted to engage such body portion outside of said bath.

5. The invention as set forth in claim 1 including: a transducer operatively connected to said oscillator for converting said square wave voltages generated thereby into sound waves for audible detection.

6. The invention as set forth in claim 5 wherein: said transducer has capacitive characteristics and is connected in parallel with adapted to engage such human body portion said pair of electrodes.

7. The invention as set forth in claim 3 wherein: a transducer having capacitive characteristics and is connected between the collector and emitter of said first stage.

References Cited by the Examiner
UNITED STATES PATENTS

| | | | |
|---|---|---|---|
| 2,004,751 | 6/1935 | Fischer | 128—420 X |
| 2,085,644 | 6/1937 | Ferciot | 128—407 |
| 2,263,205 | 11/1941 | Conrad | 128—419 X |
| 2,417,530 | 3/1947 | Weiser | 128—303.17 |
| 2,830,578 | 4/1958 | DeGroff | 128—419 |
| 3,025,858 | 3/1962 | Browner | 128—422 |
| 3,050,695 | 8/1962 | DuVall | 128—421 X |
| 3,057,356 | 10/1962 | Greatbatch | 128—422 |
| 3,060,386 | 10/1962 | Cerofolini | 331—107 |
| 3,064,641 | 11/1962 | Manenti | 128—2.1 |
| 3,139,556 | 6/1964 | Grontkowski | 315—158 |

RICHARD A. GAUDET, *Primary Examiner.*

JORDAN FRANKLIN, *Examiner.*